United States Patent [19]

Kissling et al.

[11] 4,443,223

[45] Apr. 17, 1984

[54] COMPOSITION AND METHOD FOR IMPROVING THE FASTNESS OF DIRECT AND REACTIVE DYEINGS ON CELLULOSE-CONTAINING SUBSTRATES

[75] Inventors: Bruno Kissling, Hagendorf; Walter Knobel, Pratteln; Tibor Robinson, Birsfelden, all of Switzerland

[73] Assignee: Sandoz Ltd., Basel, Switzerland

[21] Appl. No.: 413,015

[22] Filed: Aug. 30, 1982

Related U.S. Application Data

[63] Continuation-in-part of Ser. No. 305,424, Sep. 24, 1981, abandoned.

[30] Foreign Application Priority Data

Sep. 24, 1980 [DE]  Fed. Rep. of Germany ....... 3035916
Jun. 15, 1981 [DE]  Fed. Rep. of Germany ....... 3123662

[51] Int. Cl.³ .................... C08G 12/40; D06M 15/54; D06P 5/08
[52] U.S. Cl. .......................................... 8/496; 8/543; 8/551; 8/556; 8/918; 252/8.8; 524/612; 528/254; 528/256; 528/257; 528/258; 528/259; 528/263
[58] Field of Search ................... 8/496, 551, 554, 556; 252/8.8; 528/254

[56] References Cited

U.S. PATENT DOCUMENTS

| | | | |
|---|---|---|---|
| 2,631,920 | 3/1953 | Albrecht | 8/556 |
| 2,769,797 | 11/1965 | Suen et al. | 525/517 |
| 3,009,761 | 11/1961 | Taube et al. | 8/551 |
| 3,141,728 | 7/1964 | Bockmann et al. | 8/551 |

FOREIGN PATENT DOCUMENTS

| | | |
|---|---|---|
| 1396195 | 6/1975 | United Kingdom . |
| 2006279 | 5/1979 | United Kingdom . |
| 2070006 | 9/1981 | United Kingdom . |

*Primary Examiner*—A. Lionel Clingman
*Attorney, Agent, or Firm*—Gerald D. Sharkin; Richard E. Vila; Thomas C. Doyle

[57] ABSTRACT

The fastness of direct dyes on cellulose substrates is improved by after-treatment with the reaction product of a quaternary polyalkylene polyamine with an N-methylol resin precursor, and heat curing in the presence of a catalyst. The unfixed portion of reactive dyes substantive to cellulose may also be given improved wet and light fastness by this treatment.

16 Claims, No Drawings

COMPOSITION AND METHOD FOR IMPROVING THE FASTNESS OF DIRECT AND REACTIVE DYEINGS ON CELLULOSE-CONTAINING SUBSTRATES

This application is a continuation-in-part of our co-pending application Serial No. 305,424 filed Sept. 24, 1981, abandoned.

The invention relates to a textile treatment process for improving fastness properties, in particular the light and wash fastness properties of direct and reactive dyes on cellulose containing substrates.

Dyeings and printings with direct dyestuffs often show inadequate water and wash fastness properties. The dyestuff that is bound to the surface of the cellulose fibres is largely removed from the fibres by repeated washings, and bleeding of the dyestuff into the wash liquid can cause partial readsorption onto the undyed cellulose material.

There have been many attempts to overcome those disadvantages for example by complexing on the fibre with metal salts, formation of the dyestuff on the fibre, treatment of the dyestuff and/or the fibre with formaldehyde, impregnation with resins and after-treatment with cationic auxiliaries. The use of cationic after-treatment auxiliaries has proved particularly effective.

The disadvantage of all previously used methods is that although improved fastness is indeed attained, the results are only temporary. Even in the case of cationic after-treatment, the auxiliary is removed from the fibres by repeated washings, particularly under alkaline conditions and at high temperatures such as 50°–100° C. The loss of the cationic auxiliary means that the dyeing loses its improved wet fastness again.

It has been found that the light fastness of dyeings with direct and reactive dyes is poor with previously used methods in particular when the dyeings are of a light tone.

Reactive dyes attempt to solve the problem of wash fastness by the formation of a chemical bond between the dye molecule and the cellulose fibre. However, a disadvantage of the use of reactive dyes is that although the dyestuff which is chemically bound to the fibre has excellent wash fastness, the goods must be washed thoroughly after dyeing in order to remove residual unfixed dyestuff, which has poor wash fastness. Furthermore the fixed reactive dye itself may have inadequate fastness to agents such as chlorine or perborate.

The present invention provides a process for improving the fastness properties of a direct or reactive dyestuff on a substrate comprising cellulose fibres, by applying to the dyed or printed substrate the water-soluble product of reacting (A) a quaternary polyalkylene polyamine having at least one functional group in each recurring unit and (B) an N-methylol derivative of a urea, melamine, quanamine, triazinone, urone, carbamate or acid amide; in the presence of (C) a crosslinking catalyst and subsequently carrying out a heat-curing step.

The invention further provides a composition comprising the water-soluble product of reacting in aqueous solution (A) a quaternary polyalkalene polyamine having at least one functional group in each recurring unit and (B) an N-methylol derivative of a urea, melamine, guanamine, triazinone, urone, carbamate or acid amide.

Preferably the composition further includes a catalyst (C) for crosslinking component (B) to a substrate to which the composition is to be applied.

Preferably the alkylene group in the polyalkylene polyamine (component A) has up to four carbon atoms in the recurring unit of the polyamine and the alkylene unit may be interrupted by a heteroatom. By "functional group" is meant a group capable of reacting with an N-methylol group, for example a —NH—, —NH₂ or —OH group. Preferably each recurring unit contains a hydroxy group.

Preferably the compounds of component (A) are of formula I'

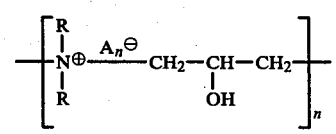

where
R is $C_{1-4}$alkyl, preferably methyl
n is 7–75, preferably 20–30, more preferably on average about 25.

Component (A) is known and may be prepared according to known methods. For example, when component (A) is of formula I' this is described in British Pat. No. 1,396,195.

Component (A) may be reacted with component (B) either alone or as a mixture with other components (A') capable of reacting with N-methylol compounds such as (B). For example, component (A') may be the product of reacting a mono- or polyfunctional primary or secondary amine with cyanamide, dicyanodiamine, guanidine or biguanidine, or ammonia with cyanamide or dicyanodiamine, said product containing reactive hydrogen atoms bound to nitrogen, as described in published British Patent Application No. 2 070 006A.

Preferred components (A') are the reaction products of dicyanodiamide with diethylene triamine, triethylene tetramine and higher polyalkylene polyamines, polypropylene polyamines or poly(hydroxypropylene)-polyamines containing up to 8 N atoms. Particularly preferred is the reaction product of dicyanodiamide with diethylene triamine.

Component (B) is generally a water-soluble N-methylol compound which is known as a crosslinking agent for cellulose fibres, and is used to impart a crease-resistant finish to cellulose fabrics. Component (B) may contain free N-methylol groups >N—CH₂OH, or these may be etherified. Preferred ether derivatives are the lower alkyl ethers having 1 to 4 carbon atoms in the alkyl groups.

Preferred N-methylol ureas are acyclic or cyclic N-methylol ureas which can be etherified.

Examples of suitable N-methylol compounds are listed below:

Urea derivatives

HOCH₂—NH.CO.NH.CH₂OH     N,N'dimethylolurea

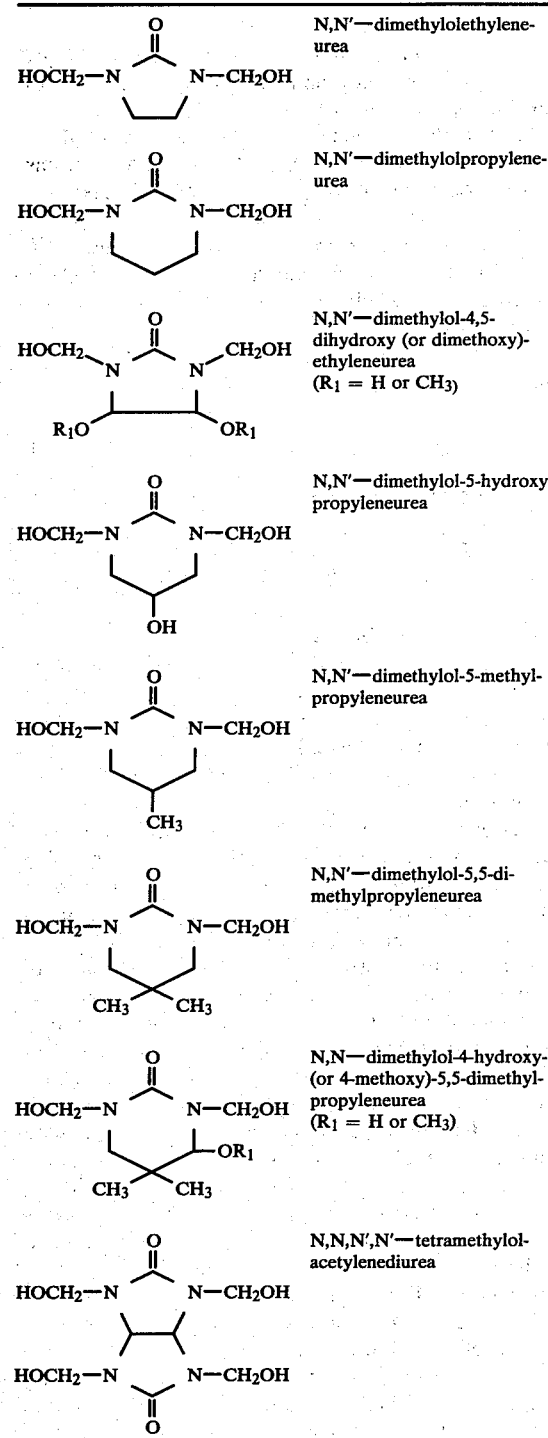
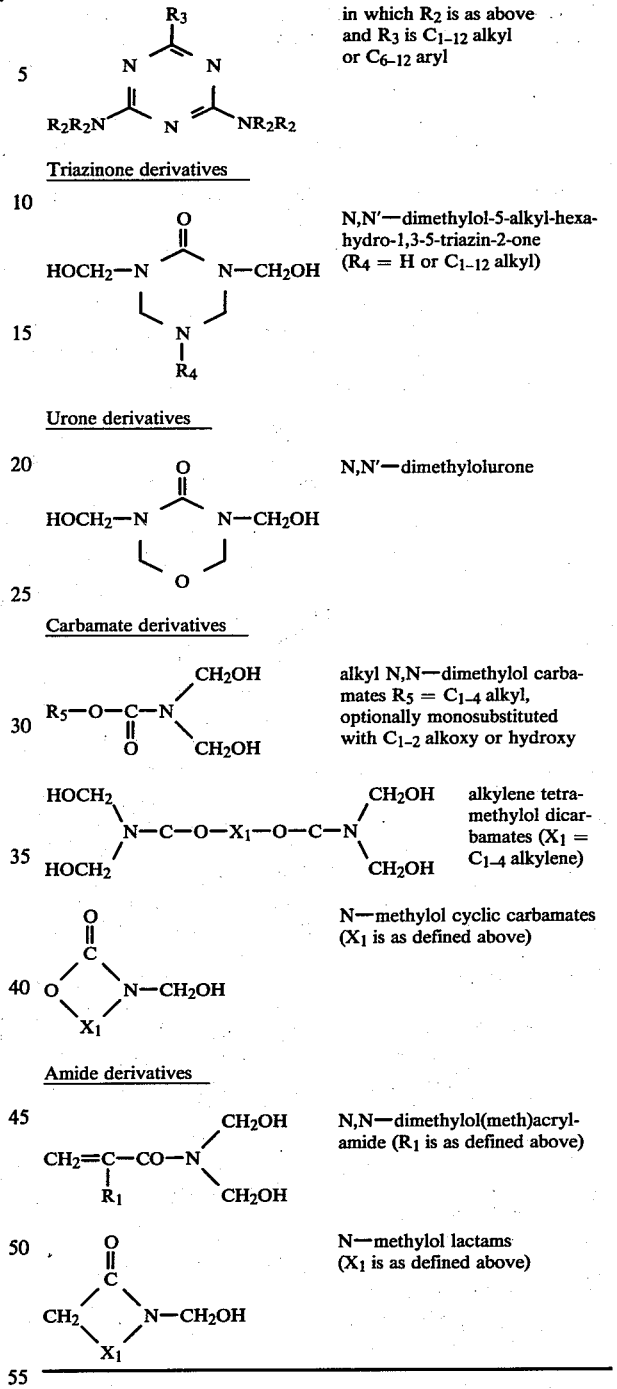

The preferred compounds of component (B) are hydrolysis-resistant reactive resin precursors, for example N,N'-dimethylol- or N,N'-dialkoxymethyl derivatives of 4,5-dihydroxy-, 4,5-dimethoxy-ethyleneurea or 5,5-dimethyl, 4-methoxy-propyleneurea and N,N'-dimethylol or N,N'-dialkoxymethyl carbamates, optionally in etherified form. Preferred ether forms are the methyl and ethyl ether derivatives. Component (B) may be a mixture of the above and may be produced by known methods.

Component (B) is generally obtained in the form of an aqueous solution containing approx. 40–50% by weight of (B), and may be used as such in the reaction with (A), or may be further diluted with water.

The reaction between components (A) and (B) is carried out in an aqueous medium, for example by adding (A) in water-free form or as an aqueous concentrate gradually to a warm aqueous solution of (B), preferably containing 30–50% (B) and 50–70% water by weight. The aqueous medium preferably has a pH between 4 and 6. The reaction is carried out before the mixture is applied to the dyed substrate, so that reaction takes place in the absence of a textile substrate.

It is strongly preferred that the catalyst (C) be present during the reaction of (A) and (B), since it may act as a catalyst for this reaction as well as for the crosslinking of component (B). Suitably it is dissolved in the aqueous solution of (B) before addition of (A). However, if (A) and (B) can react together adequately in the absence of (C), then the catalyst (C) may be added to the reaction product subsequently.

(A) and (B) are reacted together, preferably with constant stirring, at room temperature or at temperatures of up to 80° C., preferably 60°–80° C. more preferably 65°–75° C. The condensation reaction should be stopped before the reaction product becomes water-insoluble or forms a gel; suitable reaction times are of the order of 15 minutes to 2 hours. Preferably the product is fully miscible with water in all proportions. The final product preferably has a viscosity at room temperature of 50–200 centipoise, more preferably 60–150 c.p. These viscosities apply to the reaction products as they are obtained i.e. including water in amount of 30–60% (by weight).

The specific gravity of a 40–60% aqueous solution of a composition of the invention comprising the product of reacting (A) and (B) and catalyst (C) is in the region of 1.05–1.5 more preferably 1.1 to 1.3.

The proportions of component (A) (including A' if present) and (B) and catalyst (C) are preferably as follows: (A:B:C) 1:0.625–22:0.025–6 more preferably 1:1.75–7.5:0.25–1.5, calculated as dry weight of substance.

Where component (A') is present, the weight ratio of (A) to (A') is preferably from 1:10 to 10:1, more preferably from 1:2 to 2:1, more preferably about 1:1. Components (A) and (A') may be added to (B) separately or, preferably, together. It is also possible to react (A) and (A') together, for example by heating to 60°–100° C. for 30 minutes to 3 hours, before reaction with (B), and the product of this reaction with (B) is also part of the present invention.

The reaction product (addition product or precondensate) of (A) and (B) reacts with the —OH group of cellulose by means of the catalyst (C), which is known as such for the cross-linking of compounds of type (B) on cellulose. It is believed that there may also be cross-linking involving the dyestuff molecule.

Suitable catalysts (C) are of Lewis acid type and include the nitrates, sulphates, chlorides, tetrafluoroborates and dihydrogen orthophosphates of aluminum, magnesium and zinc as well as aluminium hydroxychloride, zinc oxychloride, and mixtures of any of these. These catalysts may also be used in the form of mixtures with water soluble, inorganic salts, particularly with alkali metal sulphates or alkaline earth sales, preferably chlorides. Particularly preferred are sodium or potassium sulphate and calcium chloride. Other suitable catalysts are (a) alkali metal bisulphates, for example sodium bisulphate,
(b) amine hydrochlorides, for example 2-amino-2-methylpropanol hydrochloride,
(c) organic acids, for example citric, oxalic, maleic, glycollic and trichloroacetic acids,
(d) inorganic acids, for example phosphoric and hydrochloric acids, alone or together with salts for example ammonium or calcium chloride,
and (e) ammonium salts of inorganic acids, for example ammonium nitrate, chloride, sulphate and oxalate, and mono- and di-ammonium orthophosphate.

Mixtures of any of these catalysts may be used, for example phosphoric acid-ammonium chloride, together with calcium chloride and citric acid.

Preferred catalysts (C) are the nitrates, sulphates, chlorides and dihydrogen orthophosphates of aluminium, magnesium or zinc, more preferably of magnesium, particularly magnesium chloride, optionally together with an alkali metal sulphate, particularly sodium sulphate. The choice of the optimum catalyst system will however depend primarily upon the nature of component (B), and of the textile substrate, and the man skilled in the art will be aware from numerous publications which catalyst systems are preferred for specific resin precursors and substrates.

According to the process of the invention, a substrate comprising cellulose fibres and dyed or printed with a direct or reactive dye is treated with the product of reacting components (A) and (B) or (A), (A') and (B), in the presence of a catalyst (C). The substrate may be dyed or printed by any methods conventionally used for direct or reactive dyes; for example dyeing may be carried out by exhaust dyeing from a dyebath, or by padding followed by a thermofixation or cold dwell fixation, or, in the case of reactive dyes, by alkaline fixation.

The process according to the invention is carried out upon a substrate on which the dyeing or printing process including any necessary fixation step, has been completed. The substrate may be dry or may still be damp, provided that it is not so wet that it is incapable of further pick-up. The product of reacting components (A) and (B), together with catalyst (C) is applied to the substrate in aqueous solution by dipping, spraying, foam application, padding or other conventional application techniques. The preferred application method is by padding. The process according to the invention may also be applied to dyeings of mixed cellulosic and synthetic fibres with direct or reactive dyes.

The quantities in which the product according to the invention are applied to the substrate depend largely upon the depth of the dyeing which is to be fixed. For direct dyeings of 1/1 standard depth on cotton the quantities used are 30–200 g/l of the padding liquor when applied at a pick-up of 70–100% of the dry weight of the goods. Preferably the quantity is 70–130 g/l for cotton, and 100–200 g/l for regenerated cellulose. For application to mixtures of cellulose fibres and synthetic fibres, the quantity to be applied is calculated on the basis of the cellulose content of the substrate.

In the case of dyeings with reactive dyes, the quantity of product to be used will depend upon the amount of unfixed dyestuff remaining on the goods. By treatment of such dyeings with the process of the invention, the wash fastness of the residual unfixed reactive dye may be improved to the point where extensive washings to remove unfixed dye are no longer necessary.

The padding liquor may contain further auxiliaries such as stiffening agents, softening agents, agents to improve the rubbing or breaking strength, soil-release products, hydrophobic agents and others provided that these are capable of forming stable aqueous solutions when mixed with the product according to the invention.

After application of the padding liquor, the substrate is subjected to a heat curing step such as is conventional for resin treatments based on compounds of type (B). The substrate may for example be dried at 70°–120° C. and finally cross-linked at a temperature of 130°–180° C. for 30 seconds to 8 minutes, or alternatively simultaneously dried and cross-linked by heat treatment at 120°–200° C., preferably 140°–180° C. for 5 seconds to 8 minutes depending on the temperature. Preferably the substrate is dried to 3–4% humidity. A preferred process involves heating the padded substrate to 170°–180° C. for 5 to 300 seconds preferably 30 seconds to 60 seconds.

The process of the invention is preferably carried out upon substrates dyed with direct dyes, of which metal complex dyes, particularly copper complex dyes, are preferred.

Formulae II–XIII are examples of particularly suitable dyestuffs in connection with which the process of the present invention may be used.

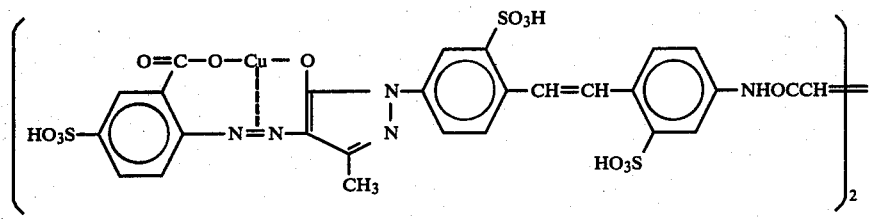

II

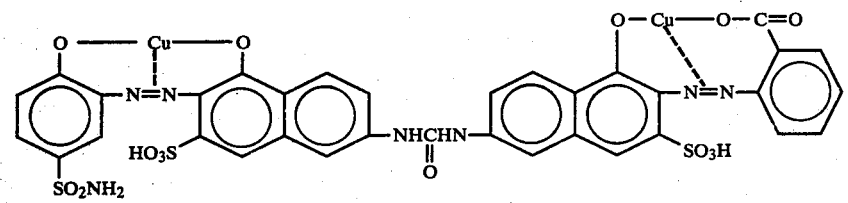

III

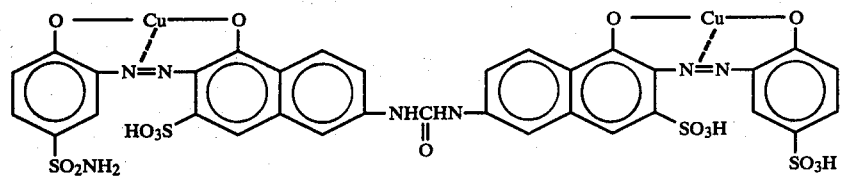

IV

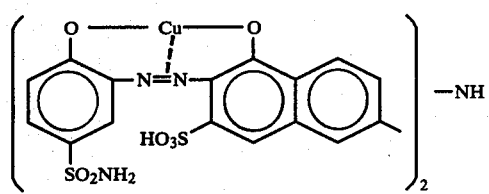

V

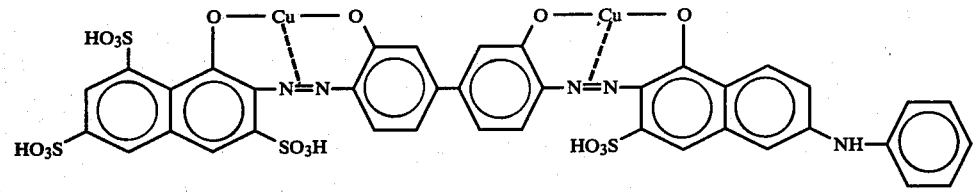

VI

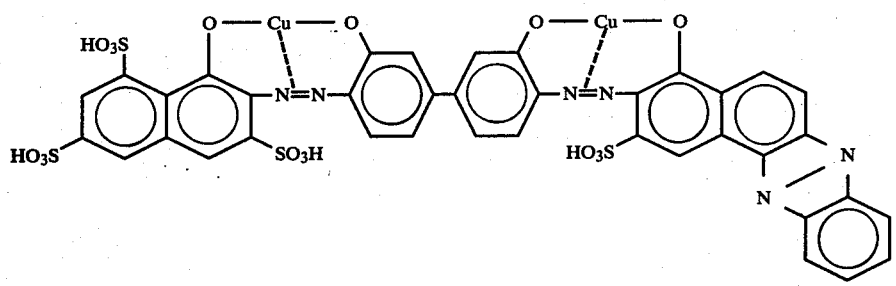

VII

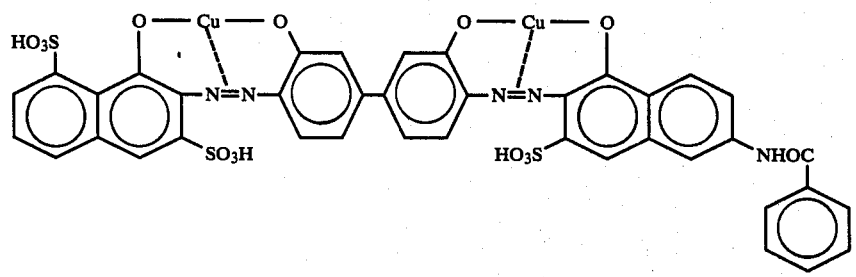
VIII
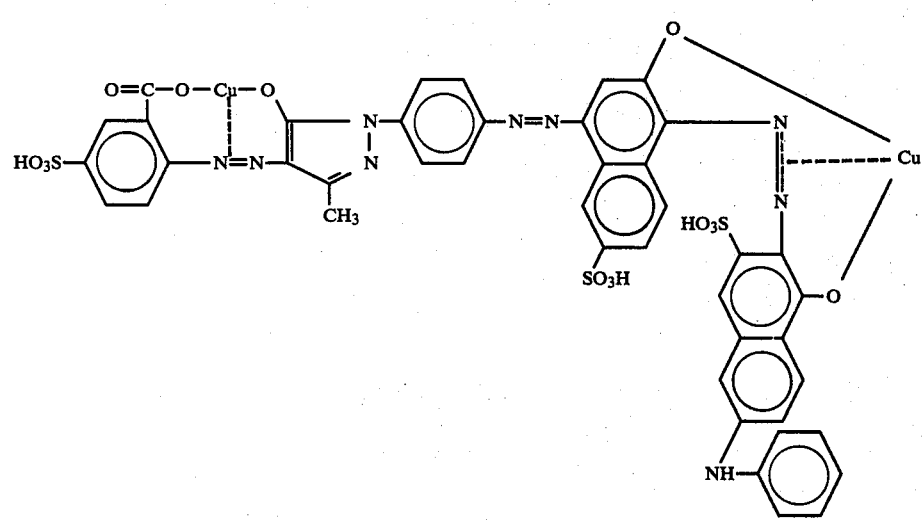
IX
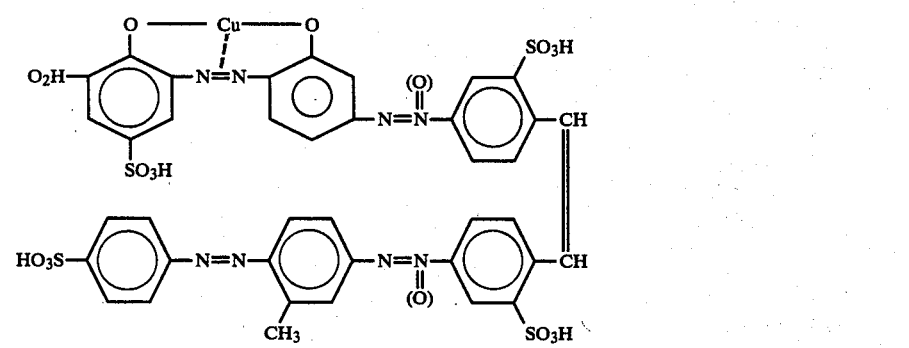
X
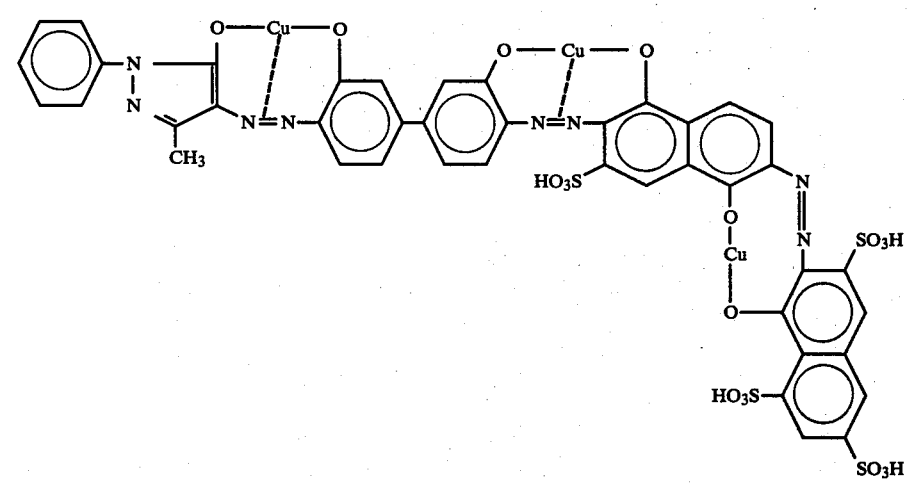
XI

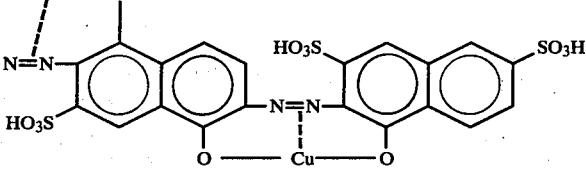

XII

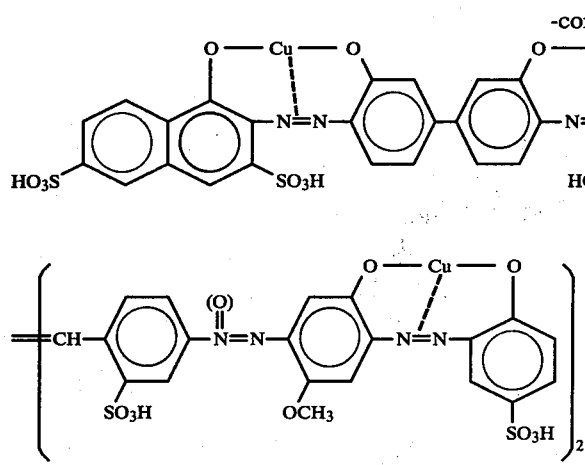

XIII

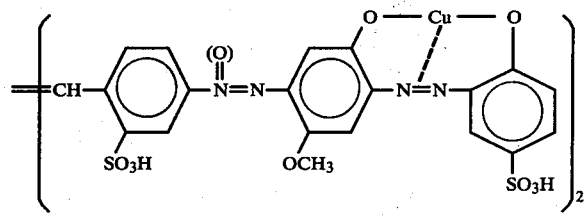

The composition of the invention can also be used in conjunction with a composition comprising the reaction product of the condensation product of a mono- or polyfunctional primary or secondary amine with cyanamide, dicyanodiamide, guanidine or biguanididine; or ammonia with cyanamide or dicyanodiamide, said product containing reactive hydrogen atoms bound to nitrogen, with component B above defined and catalyst C above defined.

Cellulose textile substrates when dyed with direct or reactive dyes and treated with a composition or process according to the invention give improved light fastness properties particularly when the dyeings are light in tone. This is particularly so when component (A) is a compound of formula I'. Further, cellulose textile substrates when dyed with reactive dyes and treated with a composition or process according to the invention have improved hydrolysis stability, peroxide fastness and perborate fastness properties.

Treatment of dyed cellulose textile substrates with a composition or process according to the invention give improved fastness to washing including washing under alkaline conditions at temperatures of 40°–100° C., particularly at 60° C. and above. For example repeated 30 minute 60° C. washings with a wash liquor containing 5 g/l soap and 2 g/l soda at a goods to liquor ratio of 1:50 are readily withstood. Cellulose of all types can be so treated, including a mixture of natural and synthetic fibres, to give dyeings with direct dyes having a good wash fastness.

In the case of dyeings with reactive dyes the wash fastness of the unfixed dye may be raised to approximately the same level as that of the fixed dye thereby eliminating the need to remove the unfixed dye.

At the same time a resin finish is imparted to the cellulose fibres which gives reduced swelling in aqueous or alkaline media and hence more rapid drying, improved dimensional stability and higher crease resistance.

The invention will now be illustrated by reference to the accompanying Examples in which all percentages and parts are by weight and all temperatures are in degrees Centigrade unless indicated to the contrary.

EXAMPLE 1

100 Parts of a 50% aqueous solution of the reaction product of epichlorohydrin and dimethylamine, prepared as described in Example 1 of British Pat. No. 1,396,195 and having the formula (a)

$$\left[ \begin{array}{c} Cl^{\ominus} \diagup CH_3 \\ -N^{\oplus} -CH_2-CH-CH_2- \\ \diagdown CH_3 \quad OH \end{array} \right]_n \quad (a)$$

where n denotes an average value of about 25 and 150 parts of a 50% aqueous solution of dimethyloldihydroxyethylene urea are stirred together until a homogeneous solution results. 20 Parts of MgCl$_2$ hexahydrate are then added and the temperature is raised over 10 minutes to 70° and held for a further 30 minutes at this temperature. The resulting precondensate is soluble in water and can be used as such for the fixation of direct and reactive dyes.

EXAMPLE 2

80 Parts of the 50% aqueous solution of the reaction product of formula (a) described in Example 1, 120 parts of a 50% aqueous solution of dimethyloldihydroxyethylene urea and 15 parts of MgCl$_2$ hexahydrate are brought together according to the method of Example 1 to produce an effective composition for improving the light fastness properties of dyeings with substantive dyes.

EXAMPLE 3

80 Parts of a 50% aqueous solution of the reaction product of the formula (a) described in Example 1, 100 parts of a 50% aqueous solution of dimethyloldihydroxyethylene urea and 15 parts of MgCl$_2$ hexahydrate are brought together according to the method of Example 1 to form an effective composition for improving the light fastness properties of dyeings with substantive dyes.

EXAMPLE 4

(a) 104 Parts diethylene triamine are mixed with 84 parts dicyanodiamide (DCDA) and slowly heated to 100°–110°. When evolution of ammonia ceases, the temperature has reached 140° and the mixture is allowed to react at this temperature for 14–16 hours. The product is allowed to solidify and is ground to a powder, neutralized with acid and dried.

(b) 100 Parts of a 50% (wt.) aqueous solution of dimethyloldihydroxyethylene urea is warmed to 70°–80° then treated with 15 parts of MgCl$_2$.6H$_2$O. To the clear solution is added portionwise 10 parts of the product of (a) above, and 20 parts of a 50% aqueous solution of the reaction product of epichlorohydrin and dimethylamine described in Example 1, stirring until all solids dissolve. The mixture is stirred a further 2-3 hours at 70°, to give a clear yellow liquid which can be used as such or after further dilution for the fixing of direct and reactive dyes.

EXAMPLE 5

(a) 50 Parts of a 50% aqueous solution of the reaction product of epichlorohydrin and dimethylamine described in Example 1 are mixed with 30 parts of a 50% aqueous solution of the product of Example 4(a). The mixture is stirred and heated to 82°-83° for 45 minutes, then cooled to 55°-60°, held at this temperature for 10 minutes, then cooled in a water bath to 20°-25°. A milky white liquid is obtained.

(b) 40 Parts of the reaction product of Example 5(a) are added to 100 parts of a 50% aqueous solution of dimethyloldihydroxyethylene urea, warmed to 70°-80° and containing 10 parts MgCl$_2$.6H$_2$O, and the mixture is stirred for 2 hours at 70°.

EXAMPLE 6

A cotton fabric dyed with a 1/1 standard depth dyeing of C.I. Direct Blue 90 is padded with an aqueous solution containing 100 g/l of the product of Example 1 and squeezed out to give a pick up of about 80%. The fabric is then shock dried on a tension frame at 175°-180° in such a way that the dry fabric is 30-45 seconds at this temperature.

The fixed dyeing exhibits excellent fastness properties especially wash- and light-fastness and withstands repeated 60° washes and even a wash at the boil. At the same time there is a clear improvement of crease resistance and the swelling value of the cellulose fibres is decreased.

EXAMPLE 7

A dyeing with 3% of C.I. Direct Blue 251 on cotton is treated with 80 g/l of an aqueous solution of the product of Example 1 according to the method of Example 6.

An excellent wash fastness, together with improved crease resistance, is obtained.

EXAMPLE 8

A dyeing with 2.4% C.I. Direct Violet 66 is treated according to the method of Example 6 with the product of Example 1.

An improved wash fastness is obtained allowing repeated washings at high temperatures.

EXAMPLE 9

A cotton fabric lightly dyed with ⅓ standard depth dyeing of C.I. Direct Blue 90 is treated according to the method of Example 6. The fixed dyeing shows improved light fastness and good wash fastness properties and withstands repeated washings at 60°. Further there is a clear improvement of crease resistance and the swelling value of the cellulose fibres is decreased.

EXAMPLE 10

A light cotton dyeing with 0.2% C.I. Direct Green 68 is treated with 80 g/l of an aqueous solution of the product of Example 3, according to the method of Example 6.

The resulting fixed dyeing has improved light fastness and improved cease resistance properties. The wash fastness at 60° is good.

EXAMPLE 11

A dyeing with 0.1% Direct Violet 60 is treated with the product of Example 3 according to the method of Example 6.

The fixed dyeing shows an improved wash fastness and an improved light fastness property.

EXAMPLE 12

A cotton fabric is dyed with C.I. Reactive Violet to a standard depth of 2/10 using a conventional dyeing process for reactive dyes without the final washing step. A light lilac colour is produced.

The fabric is then treated according to the method of Example 6.

A clear improvement in light fastness is found.

EXAMPLES 13-26

Examples 6-12 are repeated using the product of Examples 4(b) and 5(b).

What is claimed is:

1. A process for improving the fastness properties of a direct or reactive dyestuff on a substrate comprising cellulose fibers, which process comprises applying to a substrate dyed or printed with such a dyestuff
   (1) a water-soluble product of reacting in aqueous solution either
      (A) a quaternary polyalkylene polyamine having at least one —NH—, —NH$_2$ or —OH group in each recurring unit and
      (B) an N-methylol derivative of a urea, melamine, guanamine, triazine, urone, carbamate or acid amide,
   or (A) and (B), as defined above, and
      (A') the product of reacting a mono- or polyfunctional primary or secondary amine with cyanamide, dicyanodiamide, guanidine or biguanidine, said component (A') containing reactive hydrogen atoms bound to nitrogen,
   and (2) a catalyst (C) for crosslinking component (B), and subjecting the thus-treated substrate to a heat-curing step.

2. A process according to claim 1 wherein, in component (A), each recurring unit contains an —OH group.

3. A process according to claim 1 wherein, in the water-soluble product (1),
   (A) is a quaternary polyalkylene polyamine in which the recurring alkylene unit contains up to four carbon atoms and each recurring unit contains a hydroxy group as a functional group,
   (B) is selected from the group consisting of N,N'-dimethylol-4,5-dihydroxyethyleneurea, N,N'-dimethylol-4,5-dimethoxyethyleneurea, N,N'-dimethylol-5,5-dimethyl-4-methoxypropyleneura, N,N'-dimethylol carbamates and the methyl and ethyl ethers of said compounds, and
   (A') is the product of reacting a mono- or polyfunctional primary or secondary amine with cyanamide, dicyanodiamide, guanidine or biguanidine, said component (A') containing reactive hydrogen atoms bound to nitrogen.

4. A process according to claim 3 wherein component (A) is of formula I'

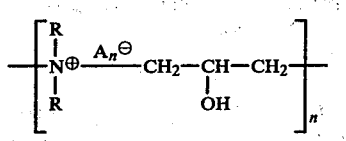

in which
R is $C_{1-4}$alkyl and
n is 7 to 75.

5. A process according to claim 3 wherein component (A') is a reaction product of dicyanodiamide with diethylene triamine, triethylene tetramine or a polypropylene or poly(hydroxypropylene)polyamine containing up to 8 nitrogen atoms.

6. A process according to claim 1 wherein catalyst (C) is a nitrate, sulphate, chloride or dihydrogen orthophosphate of aluminum, magnesium or zinc.

7. A process according to claim 3 wherein catalyst (C) is a nitrate, sulphate, chloride or dihydrogen orthophosphate of aluminum, magnesium or zinc.

8. A process according to claim 4 wherein the water-soluble product (1) is the product of reacting a compound of formula I' and N,N'-dimethylol-4,5-dihydroxyethyleneurea.

9. A process according to claim 4 wherein component (A) is a reaction product of dimethylamine and epichlorohydrin.

10. A process according to claim 8 wherein component (A) is a reaction product of dimethylamine and epichlorohydrin.

11. A process according to claim 3 wherein the water-soluble product (1) is a product obtained by reacting component (B) with a mixture of from 1 to 10 parts of component (A) and from 1 to 10 parts of component (A').

12. A process according to claim 1 wherein the ratio (A)+A':(B):(C) is 1:0.625–22:0.025–6, based on the dry weight of the components.

13. A process according to claim 3 wherein the ratio (A):(B):(C) is 1:0.625–22:0.025–6, based on the dry weight of the components.

14. A process according to claim 4 wherein the ratio of (A)+A':(B):(C) is 1:0.625–22:0.025–6, based on the dry weight of the components.

15. A process according to claim 5 wherein the ratio of (A)+A':(B):(C) is 1:0.625–22:0.025–6, based on the dry weight of the components.

16. A process according to claim 7 wherein the ratio of (A)+A':(B):(C) is 1:0.625–22:0.025–6, based on the dry weight of the components.

* * * * *